United States Patent
Jain et al.

(10) Patent No.: US 8,767,013 B2
(45) Date of Patent: Jul. 1, 2014

(54) SYSTEM AND METHOD FOR RENDERING A SKY VEIL ON A VEHICLE DISPLAY

(75) Inventors: Vivek Jain, Haryana (IN); David A. Wright, Phoenix, AZ (US); Jason F. Harvey, Glendale, AZ (US); Jary Engels, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 154 days.

(21) Appl. No.: 13/313,859

(22) Filed: Dec. 7, 2011

(65) Prior Publication Data

US 2013/0147823 A1    Jun. 13, 2013

(51) Int. Cl.
*G01C 23/00*    (2006.01)

(52) U.S. Cl.
USPC ........... 345/629; 340/975; 340/945; 340/963; 340/967; 340/970; 340/973; 340/974; 701/14; 701/301; 701/4

(58) Field of Classification Search
None
See application file for complete search history.

(56) References Cited

U.S. PATENT DOCUMENTS

| | | | | |
|---|---|---|---|---|
| 3,999,007 A | * | 12/1976 | Crane | 348/123 |
| 4,263,726 A | * | 4/1981 | Bolton | 434/43 |
| 7,098,913 B1 | * | 8/2006 | Etherington et al. | 345/426 |
| 7,268,702 B2 | * | 9/2007 | Chamas et al. | 340/975 |
| 7,477,164 B1 | * | 1/2009 | Barber | 340/945 |
| 7,605,719 B1 | * | 10/2009 | Wenger et al. | 340/974 |
| 7,724,155 B1 | * | 5/2010 | Anderson et al. | 340/975 |
| 7,825,831 B2 | * | 11/2010 | Naimer et al. | 340/975 |
| 8,244,418 B1 | * | 8/2012 | Frank et al. | 701/14 |
| 2003/0179109 A1 | * | 9/2003 | Chamas et al. | 340/973 |
| 2004/0160341 A1 | * | 8/2004 | Feyereisen et al. | 340/970 |
| 2006/0066459 A1 | * | 3/2006 | Burch et al. | 340/980 |
| 2006/0212182 A1 | * | 9/2006 | Shaw | 701/12 |
| 2006/0241821 A1 | * | 10/2006 | Hrabak et al. | 701/3 |
| 2007/0085705 A1 | * | 4/2007 | He et al. | 340/967 |
| 2007/0109569 A1 | * | 5/2007 | Eschbach et al. | 358/1.9 |
| 2008/0262664 A1 | * | 10/2008 | Schnell et al. | 701/4 |
| 2009/0121901 A1 | * | 5/2009 | Namier et al. | 340/975 |
| 2010/0141482 A1 | * | 6/2010 | Wyatt et al. | 340/975 |
| 2011/0095913 A1 | * | 4/2011 | Painter et al. | 340/972 |
| 2011/0130897 A1 | * | 6/2011 | Gladysz et al. | 701/15 |
| 2012/0026190 A1 | * | 2/2012 | He et al. | 345/633 |
| 2012/0166076 A1 | * | 6/2012 | Hardy | 701/414 |

OTHER PUBLICATIONS

Taylor, R.M.; Aircraft Attitude Awareness From Visual Displays; Displays, Apr. 1988, 1988 Butterworth & Co (Publishers) Ltd.
Cone, S.M., Hassoun, J.A.; Attitude Awareness Enhancements for the F-16, Oct. 1992, 93-02972.
Beringer, D.B.; Ball, J.D.; Brennan, K.; Taite, S.; The Effect of Terrain-Depicting Primary-Flight-Display Backgrounds and Guidance Cues on Pilot Recoveries From Unknown Attitudes.

* cited by examiner

*Primary Examiner* — Xiao Wu
*Assistant Examiner* — Greg Raburn
(74) *Attorney, Agent, or Firm* — Ingrassia Fisher & Lorenz, P.C.

(57) ABSTRACT

Methods and systems are provided for improving pilot situational awareness during brown-over-brown display situations. An image is rendered, on a display, that includes one of, or both, rendered terrain and rendered sky. A sky veil is at least selectively rendered on a portion of the display. The sky veil, when rendered, is rendered at least partially transparent and in a manner that portions of the sky veil that overlap with rendered sky are not discernable, and rendered terrain is viewable through portions of the sky veil that overlap with terrain.

14 Claims, 4 Drawing Sheets

SYSTEM AND METHOD FOR RENDERING A SKY VEIL ON A VEHICLE DISPLAY

TECHNICAL FIELD

The present invention generally relates to vehicle displays, and more particularly relates to systems and methods for rendering a sky veil on a vehicle display.

BACKGROUND

In the world of aviation, pilot situational awareness can be of paramount importance. Various display systems and methods have thus been developed to provide pilots with improved situational awareness. One particular type of display system that has been developed is generally referred to as a synthetic vision system (SVS). An SVS provides improved situational awareness by rendering a perspective or 3-dimensional synthetic image representative of an "out-the-window" view of a pilot. In most instances, the synthetic image is rendered as background on the primary flight display (PFD).

There are certain display situations during which the entire background of the PFD (or other display) may render only terrain, and no sky. Such display situations, which are generally referred to as "brown-over-brown" situations, may occur when an aircraft is flying near certain terrain, such as mountains, or when an aircraft is landing. Because no sky is rendered during brown-over-brown display situations, it is postulated that such situations could potentially cause pilot confusion and/or disorientation.

Hence, there is a need for a system and method of providing pilot situational awareness during brown-over-brown display situations. The present invention addresses at least this need.

BRIEF SUMMARY

System and methods are provided herein for improving pilot situational awareness during brown-over-brown display situations.

In one embodiment, a method for rendering images on a display that is disposed within a vehicle includes rendering an image, on the display, that includes one of, or both, rendered terrain and rendered sky, and at least selectively or continuously rendering a sky veil on a portion of the display. The sky veil, when rendered, is at least partially transparent and in a manner that portions of the sky veil that overlap with rendered sky are not discernable, and rendered terrain is viewable through portions of the sky veil that overlap with terrain.

In another embodiment, a vehicle display system includes a terrain data source, a display device, and a processor. The terrain data source supplies terrain data that are representative of terrain in a field of view of an operator of a vehicle. The display device is coupled to receive image rendering display commands and is configured, upon receipt thereof, to render images. The processor is coupled to the display device and to the terrain data source. The processor is configured to selectively retrieve terrain data from the terrain data source and to supply image rendering display commands to the display device that cause the display device to render an image that includes one of, or both, rendered terrain and rendered sky, and to at least selectively or continuously render a sky veil on a portion of the display. The sky veil, when rendered, is at least partially transparent and in a manner that portions of the sky veil that overlap with rendered sky are not discernable, and rendered terrain is viewable through portions of the sky veil that overlap with terrain.

Furthermore, other desirable features and characteristics of the display system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
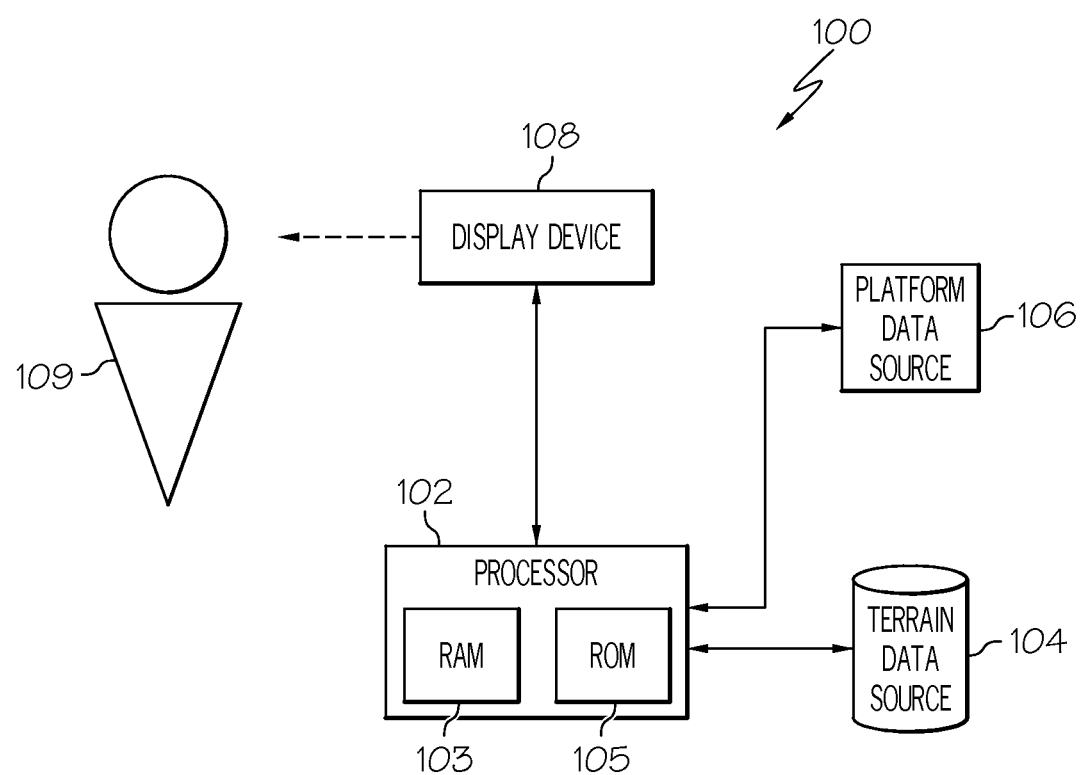
FIG. 1 depicts a functional block diagram of an embodiment of a portion of an aircraft avionics display system.

Referring to FIG. 1, an embodiment of portion of an aircraft avionics display system 100 is depicted and includes a processor 102, a terrain data source 104, one or more platform data sources 106, and a display device 108. The processor 102 may be any one of numerous known general-purpose microprocessors or an application specific processor that operates in response to program instructions. In the depicted embodiment, the processor 102 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used.

No matter how the processor 102 is specifically implemented, it is in operable communication with the terrain data source 104, the one or more platform data sources 106, and the display device 108. The processor 102 is coupled to receive various types of platform-related data from the platform data source(s) 106 and is configured, in response to these data, to selectively retrieve terrain data from the terrain data source 104 and to supply appropriate image rendering display commands to the display device 108. The display device 108, in response to the image rendering display commands, selectively renders various types of textual, graphic, and/or iconic information. The preferred manner in which the textual, graphic, and/or iconic information are rendered by the display device 108 will be described in more detail further below. Before doing so, however, a brief description of the terrain database 104 and the sensors 106 will be provided The terrain data source 104 supplies terrain data that are representative of the terrain that is at least within in the field of view of the operator 109 of the platform—in this case, the platform in an aircraft and the operator is a pilot 109. It will be appreciated that although the terrain data source 104 is, for clarity and convenience, depicted as being implemented in a storage structure that is separate from the processor 102, all or portions of the terrain data source 104 could be loaded into the on-board RAM 101, or integrally formed as part of the processor 102, and/or RAM 103, and/or ROM 105. The terrain data source 104 could also be part of a device or system that is physically separate from the display system 100.

The platform data source(s) 106 may be implemented using various numbers and types of inertial and positioning sensors, systems, and or subsystems, now known or developed in the future, for supplying various types of platform data. In some embodiments, the system 100 may be implemented without separate platform data source(s) 106. In these latter embodiments, the platform data may be, for example, simulated data. In either case, the platform data that is supplied from the platform data source(s) 106 include data representative of the state of the platform such as, for example, attitude, speed (ground speed, airspeed, vertical speed, etc.), altitude, and heading, just to name a few.

The display device 108, as noted above, in response to the image rendering display commands supplied from the processor 102, selectively renders various textual, graphic, and/or iconic information, and thereby supplies visual feedback to the vehicle operator 109. It will be appreciated that the display device 108 may be implemented using any one of numerous known display devices suitable for rendering textual, graphic, and/or iconic information in a format viewable by the operator 109. Non-limiting examples of such display devices include various cathode ray tube (CRT) displays, and various flat panel displays such as various types of LCD (liquid crystal display) and TFT (thin film transistor) displays. The display device 108 may additionally be implemented as a panel mounted display, a HUD (head-up display) projection, various portable and/or hand-held displays, or any one of numerous known technologies. It is additionally noted that the display device 108 may be configured as any one of numerous types of aircraft flight deck displays that may implement the functionality of a moving map display. For example, the display device 108 may be configured as a multi-function display, a horizontal situation indicator, a vertical situation indicator, or a navigation display just to name a few. In the depicted embodiment, however, the display device 108 is configured as a primary flight display (PFD).

Figure 2:
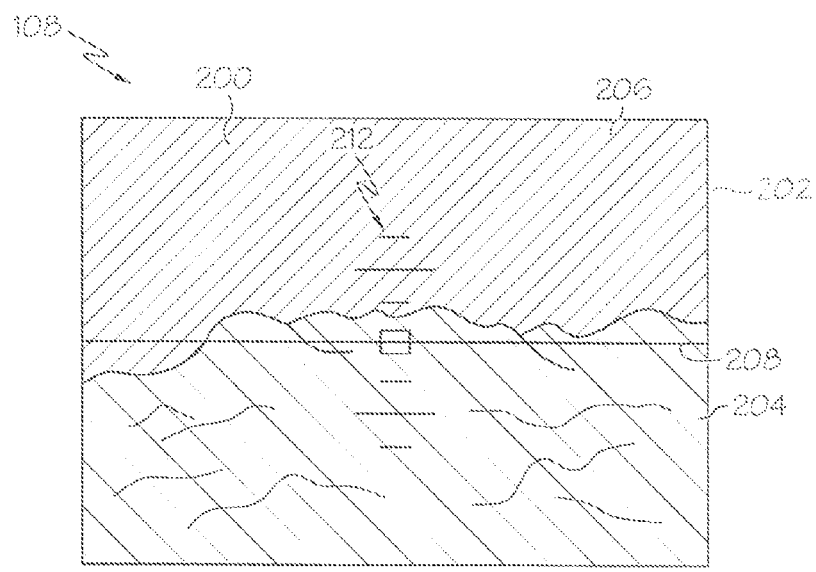
FIG. 2 depicts a simplified representation of a primary flight display that may be used in the system of FIG. 1.

Turning now to FIG. 2, an embodiment of an image 200 that may be rendered on the display 202 of the display device 108 is depicted. As noted above, the depicted display device 108 is configured as a PFD, thus the rendered image 200 includes a synthetic perspective image representative of the "out-the-window" view of the pilot 109, and various flight-related information. The depicted "out-the-window" view, which is representative of a portion of the field of view of the pilot 109, includes a synthetic perspective view of terrain 204 and sky 206. The terrain 204 is preferably rendered using different shades of a first color (depicted using hatching in a first direction), whereas the sky 206 is preferably rendered in a single shade of a second color (depicted using hatching in a second direction) that differs from the first color. Though the first and second colors may vary, in the depicted embodiment the first color is an earth tone (such as brown) and the second color is a blue.

The flight-related information, which is rendered over the synthetic terrain 204 and sky 206, includes at least a zero pitch reference line (ZPRL) 208 and a pitch ladder 212. The ZPRL 208 is an imaginary reference line originating at the aircraft and parallel to the earth's surface, and thus indicates what is above and below the aircraft. The pitch ladder 212 provides an indication of aircraft pitch. Other flight-related information, such as altitude, vertical speed, flight plans, a roll pointer, a flight path vector, a flight path predictor, and the like, are also typically rendered over the synthetic terrain 204 and sky 206. However, for clarity and ease of depiction and description, this additional flight related information is not depicted.

Figure 3:
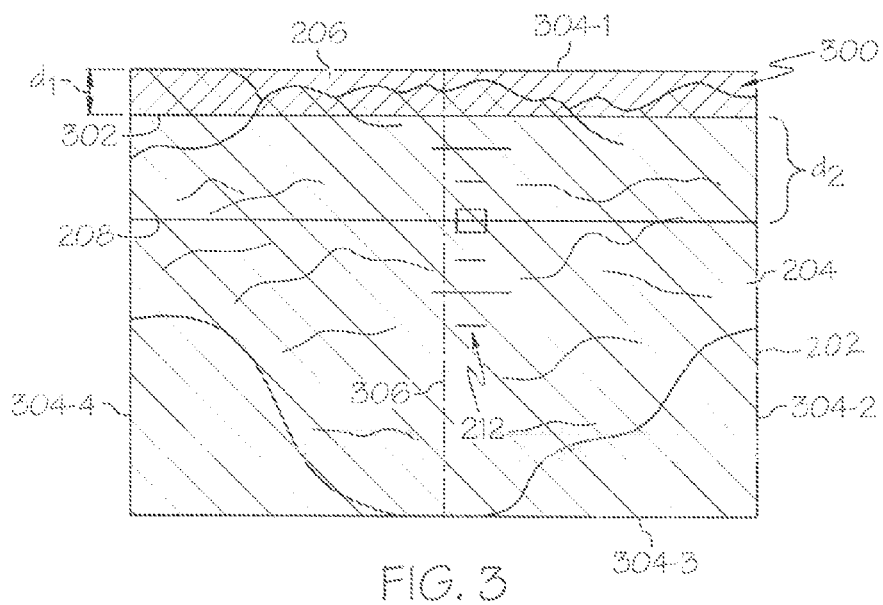
FIGS. 3 and 4 depict simplified representations of the primary flight display depicted in FIG. 2 during partial and full brown-over-brown display situations, respectively.
Figure 4:
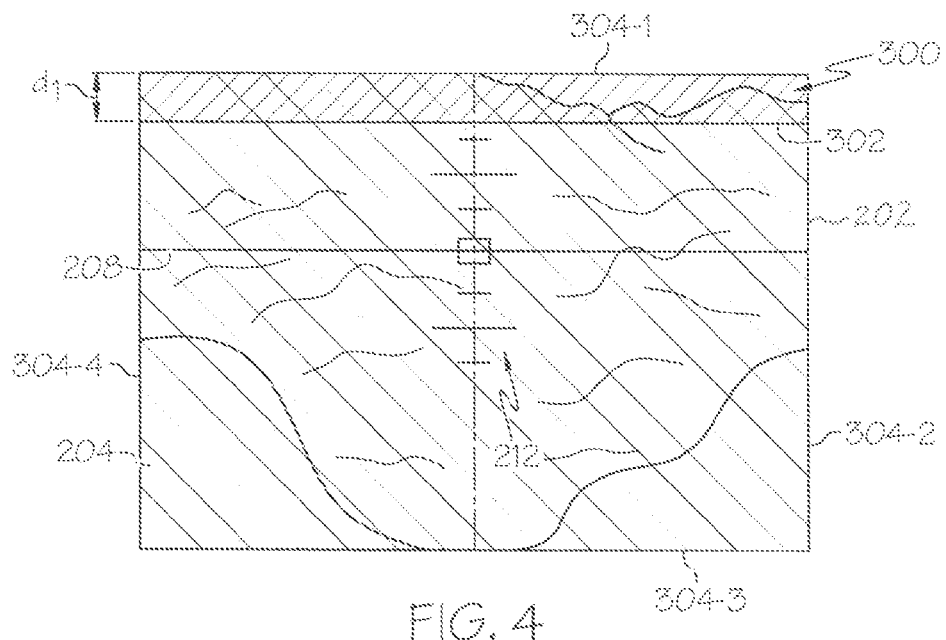
Figure 5:
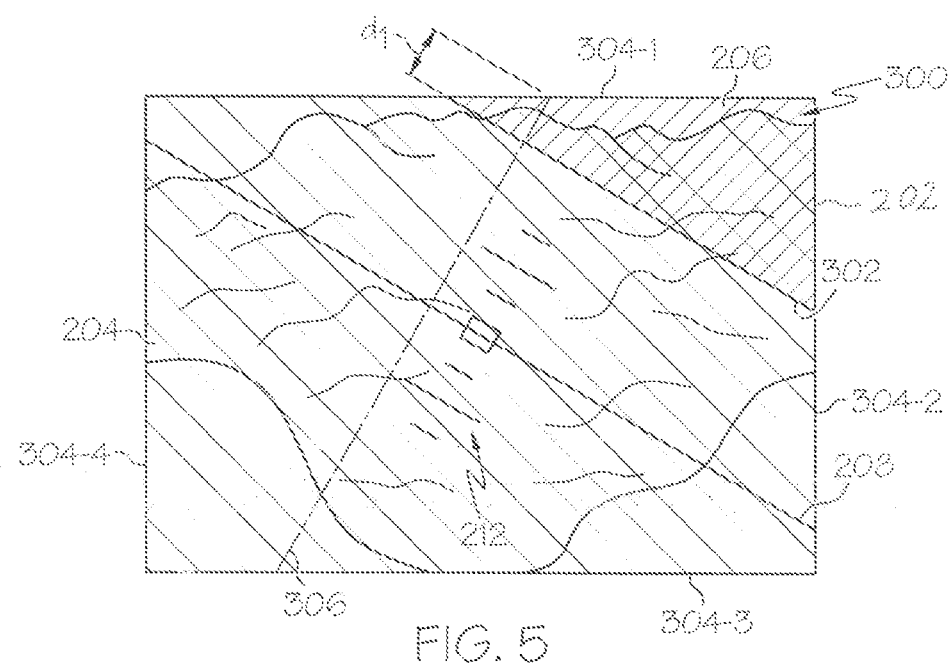
FIGS. 5 and 6 both depict a simplified representation of the primary flight display depicted in FIG. 2 during partial brown-over-brown display situations and while the aircraft is implementing a maneuver.

As was previously noted, brown-over-brown display situations may occur when an aircraft is flying near certain terrain, such as mountains, or when an aircraft is landing. An example of how the system 100 depicted in FIG. 1 implements partial and full brown-over-brown display situations is depicted in FIGS. 3-5, and will now be described. Before doing so, it is noted that the term "partial brown-over-brown display situation" means that some sky 204 is rendered on the display 200 (FIGS. 3 and 5) and the term "full brown-over-brown display situation" means that no sky 204 is rendered on the display 200 (FIG. 4).

As FIGS. 3-5 depict, in addition to rendering the synthetic perspective image representative of the "out-the-window" view of the pilot 109 and the flight-related information, the processor 102 also commands the display device 108 to render a sky veil 300. The sky veil 300 may be continuously or selectively rendered and is at least partially transparent; however, in the embodiments described below it is continuously rendered. As depicted most clearly in FIG. 3, the sky veil 300 is rendered in a manner that those portions of the sky veil 300 that overlap with rendered sky 206 are not discernable. However, as FIGS. 3 and 4 both depict, rendered terrain 204 is viewable through those portions of the sky veil 300 that overlap with the rendered terrain 204. To implement this functionality, it will be appreciated that the sky veil 300 is rendered with the same color as any rendered sky 206 (e.g., the second color).

In the depicted embodiment, the sky veil 300 includes a border 302, which provides an indication to the pilot 109 of the start of the sky veil 300. The border 302 is opaque, or at least substantially opaque, and is also rendered with the second color. As such, those portions of the border 302 that overlap with rendered sky 206 are also not discernable. However, rendered terrain 204 is not viewable through the border 302. Though not readily discernable from FIGS. 3-5, it is noted that the edges of the border 302 are preferably faded to give it a soft look and to avoid it looking like a horizon line. It will be appreciated that the sky veil 300 could, in some embodiments, be rendered without the border 302. It will additionally be appreciated that in other embodiments, the sky veil 300 could be rendered with varying levels of transparency.

Figure 6:
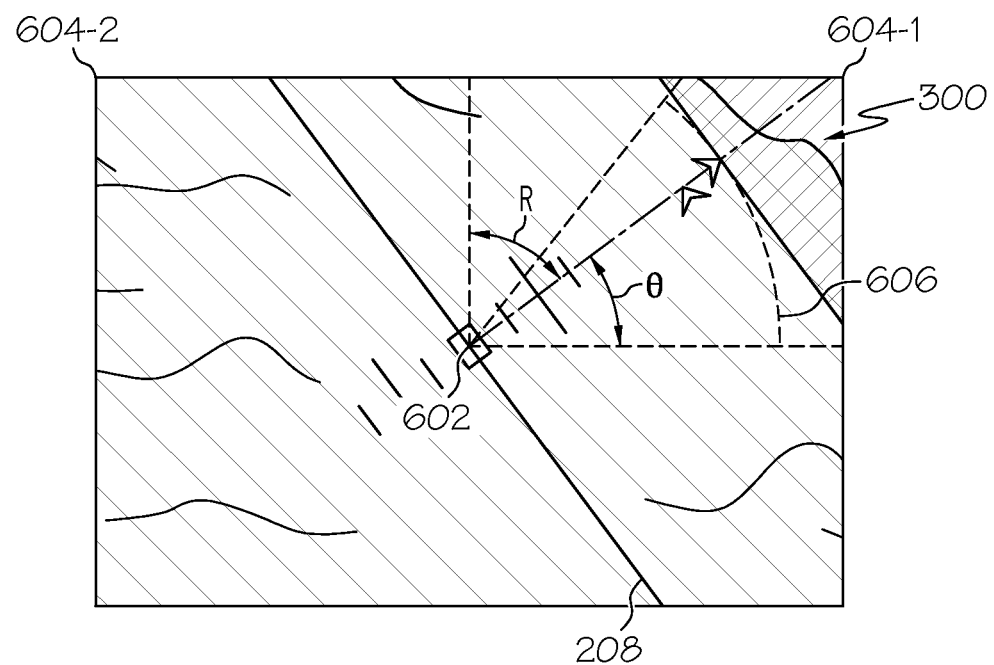

The sky veil 300 is continuously rendered between the ZPRL 208 and one or more edges 304 (e.g., 304-1, 304-2, 304-3, 304-4) of the display 202. Moreover, in the depicted embodiment, the sky veil 300 is rendered parallel to the ZPRL 208 and perpendicular to the pitch tape 212. The depicted sky veil 300 extends a predetermined distance (d) from the skyward edge of the display 202 (which is edge 304-1 in the depicted embodiment), as measured along an imaginary (e.g., non-rendered) line 306 that is at least parallel to the pitch tape 212, and thus perpendicular to the ZPRL 208. This particular disposition avoids rendering too much of the sky veil 300. However, under certain roll scenarios, such as when the pitch tape 212 approaches or is aligned with a corner of the display 202, the predetermined distance may be relatively small, resulting in the sky veil 300 being relatively small and potentially difficult to see. Thus, as depicted in FIG. 6, another algorithm is implemented to ensure a sufficient portion of the sky veil 300 is rendered under these roll scenarios. More specifically, whenever the roll angle (R) is within the angular offset (θ), as measured from the angle of the line between the center of the aircraft symbol 602 and the corner 604-1 or 604-2, the sky veil 300, while continuing to be rendered parallel to the ZPRL 208, is rendered at a constant distance (r) from the center of the aircraft symbol 602, along the tangent of the curve 606 that follows that radius (r). It will be appreciated that these particular dispositions are merely exemplary of one particular embodiment, and that the sky veil 300 could be alternately disposed. For example, rather than being continuously rendered a predetermined distance from the skyward edge of the display 304, it could be rendered a predetermined distance ($d_2$) from the ZPRL 208.

The system 100 is configured such that the sky veil 300 is rendered in the same color as any rendered sky 206. Hence, in the embodiments described above there is no triggering mechanism or event that causes the sky veil 300 to be rendered. Rather, it is continuously rendered. In other embodiments, the system 100 may be configured to selectively render the sky veil 300 in response to a triggering mechanism or event. As may be appreciated, during normal "blue-over-brown" display situations, the sky veil 300 is not discernable from the rendered sky 206, and will not present a potential distraction to the pilot.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence, unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for rendering images on a display that is disposed within a vehicle, the method comprising the steps of:
rendering an image, on the display, that includes one of, or both, rendered terrain and rendered sky, the display having a plurality of edges, the plurality of edges including a skyward edge;
rendering a pitch tape on the display;
rendering a zero pitch reference line on the display; and
at least selectively or continuously rendering a sky veil on a portion of the display, the sky veil rendered at least partially transparent and in a manner that:
(i) portions of the sky veil that overlap with the rendered sky are not discernable,
(ii) the rendered terrain is viewable through portions of the sky veil that overlap with terrain,
(iii) the sky veil is perpendicular to the pitch tape and parallel to the zero pitch reference line, and
(iv) the sky veil extends a predetermined distance from the skyward edge, as measured along a line that is at least parallel to the pitch tape.

2. The method of claim 1, further comprising:
rendering the sky veil and sky with the same color.

3. The method of claim 1, further comprising:
at least selectively or continuously rendering the sky veil with a border that is opaque and in a manner that (i) portions of the border that overlap with the rendered sky are not discernable and (ii) the rendered terrain is not viewable through the border.

4. The method of claim 3, further comprising:
rendering the sky veil, the border, and the sky with the same color.

5. The method of claim 1, further comprising:
at least selectively or continuously rendering the sky veil between the zero pitch reference line and one or more of the edges.

6. The method of claim 1, further comprising:
when the pitch tape is aligned with a corner of the display, at least selectively or continuously rendering the sky veil a predetermined distance from a predetermined point, and along a tangent of a curve having a radius, instead of the predetermined distance from the skyward edge.

7. The method of claim 1, further comprising:
at least selectively or continuously rendering the sky veil with a varying level of transparency.

8. A vehicle display system, comprising:
a terrain data source for supplying terrain data representative of terrain in a field of view of an operator of a vehicle;
a display device coupled to receive image rendering display commands and configured, upon receipt thereof, to display images, the display device including a display having a plurality of edges, the plurality of edges including a skyward edge; and
a processor coupled to the display device and the terrain database, the processor configured to selectively retrieve the terrain data from the terrain data source and supply the image rendering display commands to the display device that cause the display device to:
(i) render an image that includes one of, or both, rendered terrain and rendered sky, and
(ii) at least selectively or continuously render a sky veil on a portion of the display, the sky veil rendered at least partially transparent and in a manner that:
(a) portions of the sky veil that overlap with the rendered sky are not discernable,
(b) the rendered terrain is viewable through portions of the sky veil that overlap with terrain
(c) the sky veil is perpendicular to the pitch tape and parallel to the zero pitch reference line, and
(d) the sky veil extends a predetermined distance from the skyward edge, as measured along a line that is at least parallel to the pitch tape.

9. The system of claim 8, wherein the image rendering display commands further cause the display device to at least selectively or continuously render the sky veil and sky with the same color.

10. The system of claim 8, wherein the image rendering display commands further cause the display device to at least selectively render the sky veil with a border that is opaque and in a manner that (i) portions of the border that overlap with the rendered sky are not discernable and (ii) the rendered terrain is not viewable through the border.

11. The system of claim 10, wherein the image rendering display commands further cause the display device to render the sky veil, the border, and the sky with the same color.

12. The system of claim 8, wherein the image rendering display commands further cause the display device to at least selectively or continuously render the sky veil between the zero pitch reference line and one or more of the edges.

13. The system of claim 8, wherein, when the pitch tape is aligned with a corner of the display, the image rendering display commands further cause the display device to at least selectively or continuously render the sky veil a predetermined distance from a predetermined point, and along a tangent of a curve having a radius, instead of the predetermined distance from the skyward edge.

14. The system of claim 8, the image rendering display commands further cause the display device to at least selectively or continuously render the sky veil with a varying level of transparency.

* * * * *